No. 834,892. PATENTED NOV. 6, 1906.
W. H. DOPP.
PRESSURE FILTER.
APPLICATION FILED NOV. 3, 1904.

Witnesses:
Louis W. Gratz
Robert Weitknecht

Inventor:
William H. Dopp
By Geyer & Popp
Attorneys

No. 834,892. PATENTED NOV. 6, 1906.
W. H. DOPP.
PRESSURE FILTER.
APPLICATION FILED NOV. 3, 1904.

No. 834,892. PATENTED NOV. 6, 1906.
W. H. DOPP.
PRESSURE FILTER.
APPLICATION FILED NOV. 3, 1904.

Witnesses:
Louis W. Gratz
Robert Weitknecht

William H. Dopp,
Inventor
By Geyer & Dopp
Attorneys

UNITED STATES PATENT OFFICE.

WILLIAM H. DOPP, OF BUFFALO, NEW YORK.

PRESSURE-FILTER.

No. 834,892.

Specification of Letters Patent.

Patented Nov. 6, 1906.

Application filed November 3, 1904. Serial No. 231,297.

*To all whom it may concern:*

Be it known that I, WILLIAM H. DOPP, a citizen of the United States, residing at Buffalo, in the county of Erie and State of New York, have invented new and useful Improvements in Pressure-Filters, of which the following is a specification.

This invention relates more particularly to pressure-filters, although some features of the same are also applicable to other filters.

The principal object of my invention is the production of an apparatus of this kind which has a large filtering capacity in proportion to its size.

Another object is to provide an apparatus in which portions of the filtering surfaces or elements can be cleaned while other portions remain in use, thus permitting the filtering operation to continue without interruption and increasing the capacity of the apparatus accordingly.

Another object is to automatically cleanse the entire filtering material while outside the filter-chambers, so as to prevent accumulation of filth or breeding of bacteria in the filter.

A further object of the invention is to combine with the filter simple means for aerating, ozonizing, or sterilizing the liquid to be purified.

In the accompanying drawings, consisting of five sheets.

Similar letters of reference indicate corresponding parts throughout the several views.

Figure 1:
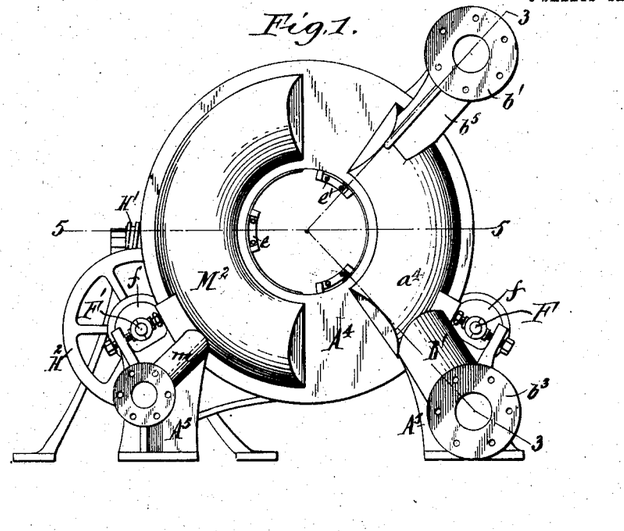
Figure 1 is a side elevation of my improved filter.
Figure 2:
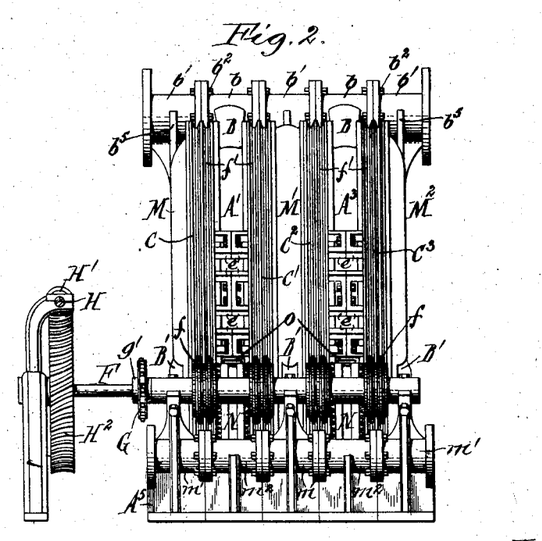
Fig. 2 is a front elevation thereof.
Figures 3, 4:
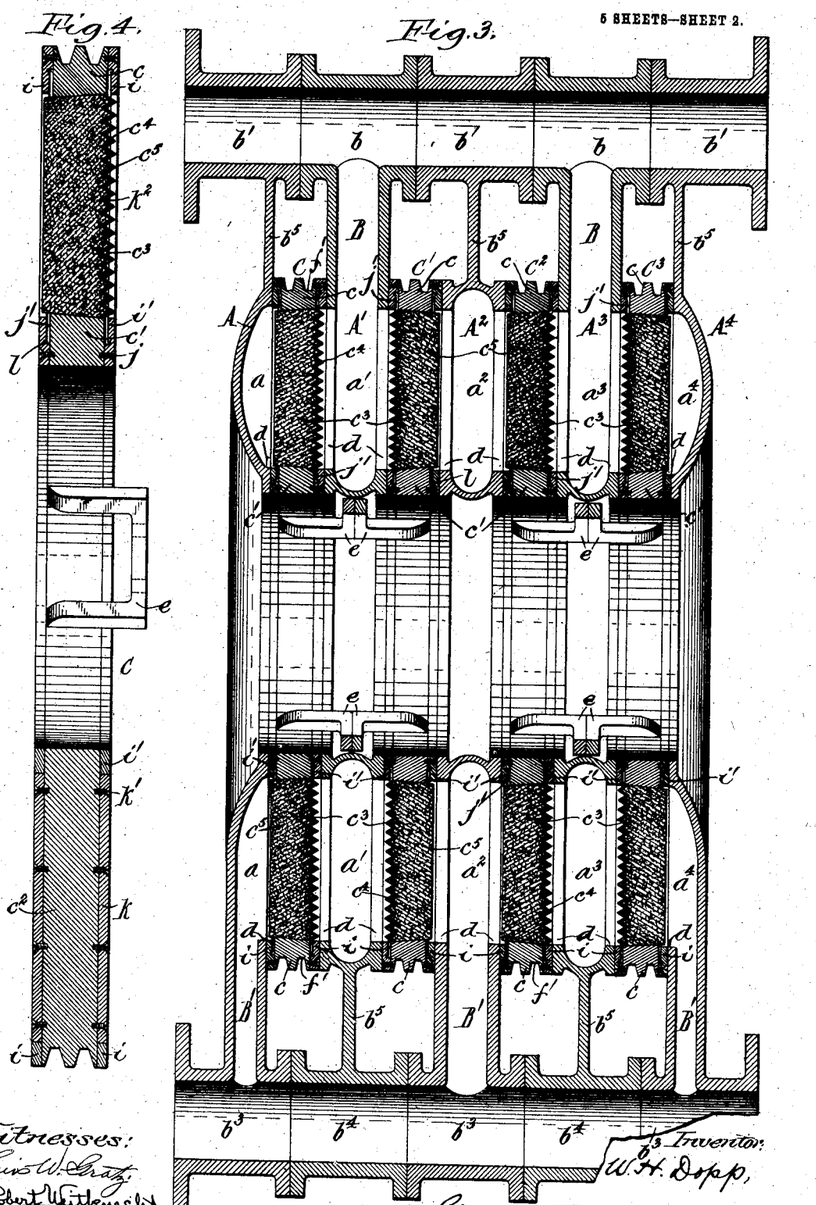
Fig. 3 is a longitudinal section in line 3 3, Fig. 1, on an enlarged scale.
Fig. 4 is an enlarged transverse central section of one of the filtering-partitions.
Figure 5:
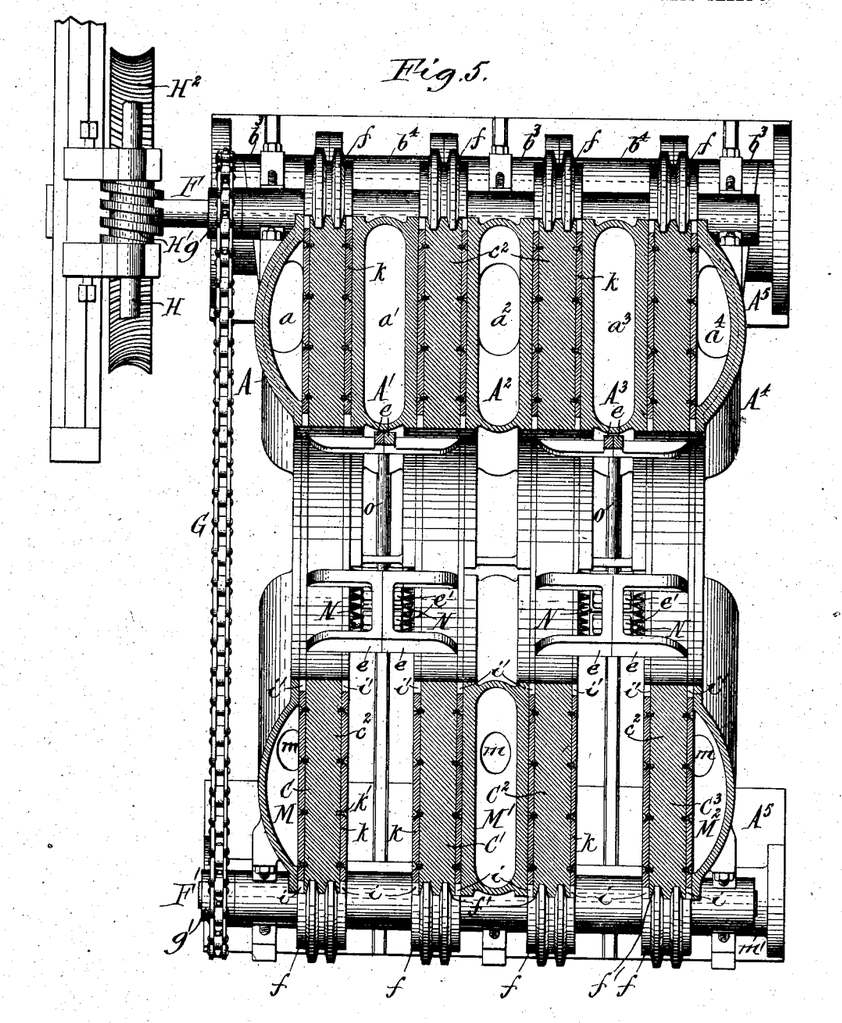
Fig. 5 is a horizontal section in line 5 5, Fig. 1, on an enlarged scale.
Figure 6:
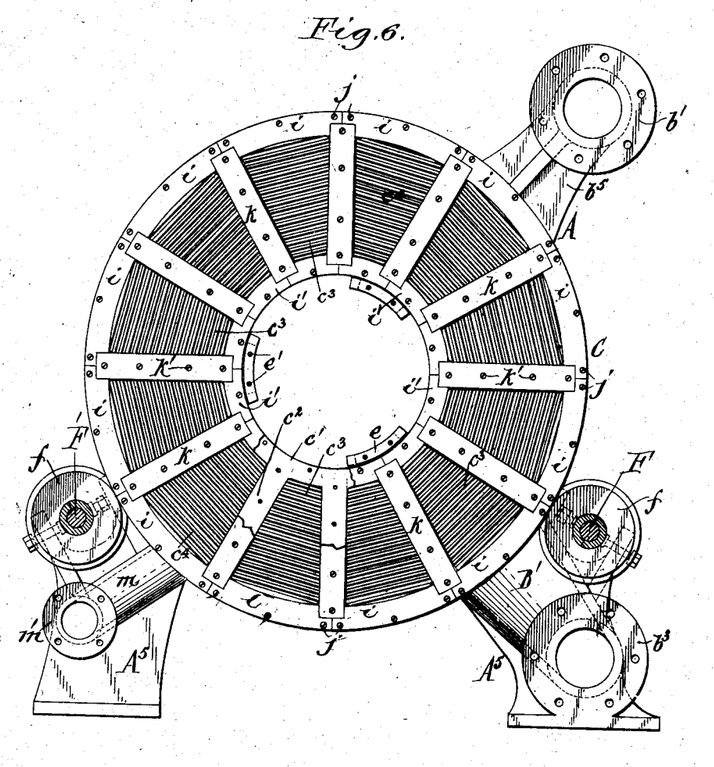
Fig. 6 is a transverse vertical section of the filter, taken between the corrugated face of one of the filtering-partitions and the opposing liquid-chamber.
Figure 7:
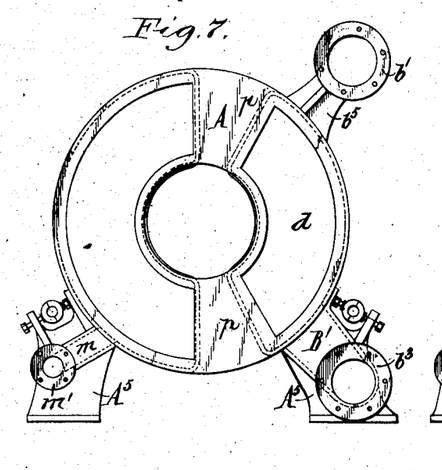
Fig. 7 is a side elevation of one of the filter-sections containing a liquid-delivery chamber and a sterilizing-chamber.
Figure 8:
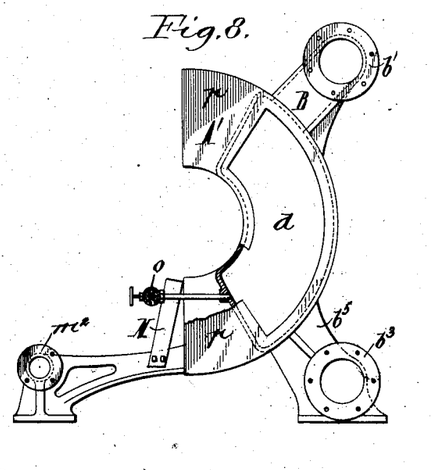
Fig. 8 is a similar view of one of the filter-sections containing a supply-chamber.

Referring to the embodiment of the invention shown in Figs. 1-8, inclusive, the body or casing of the apparatus comprises a series of upright sections A A' A² A³ A⁴, arranged side by side and provided with feet or standards A⁵, which support the apparatus. The end sections A A⁴ and the middle section A² are preferably circular, while the intermediate sections A' A³ are semicircular, as shown in Figs. 1, 7, and 8. The end sections contain segmental delivery or filtered-liquid chambers $a$ $a^4$, respectively, which are closed on their outer sides and open on their inner sides and preferably formed by hollow bulges on the outer sides of the sections, as shown in Figs. 1, 3, and 5. These segmental chambers extend around about one-third of the sections. The sections A' A³ next to the end sections are provided with segmental inlet or supply chambers $a'$ $a^3$ for the raw or unfiltered liquid, and the central section A² is provided with a similarly-shaped delivery-chamber $a^2$, these alternating supply and delivery chambers being arranged in line with one another, as shown in Figs. 3 and 5. The supply-chambers $a'$ $a^3$ are provided at their upper ends with inlet branches B, while the delivery-chambers $a$, $a^2$, and $a^4$ are provided at their lower ends with discharge branches B'.

The inlet branches of the supply-chambers are provided with alined transverse nipples $b$, and the delivery-chambers are provided at their upper ends with corresponding nipples $b'$, registering with the nipples $b$ and forming therewith a continuous supply-main, the contiguous flanges of the nipples being secured together by bolts $b^2$, as shown in Fig. 2. The branches B' of the delivery-chambers have similar transverse nipples $b^3$, which alternate with coinciding nipples $b^4$ at the lower ends of the supply-chambers, the series of nipples being bolted together and forming a continuous delivery-main, as shown in Fig. 2. These supply and delivery nipples with their connecting-bolts also serve to firmly tie together the several sections of the filter. The nipples $b'$ and $b^4$ are carried by webs or blind connections $b^5$, formed on the respective sections.

Adjacent supply and delivery chambers of the apparatus are separated by movable filtering partitions or diaphragms C C' C² C³, preferably of annular or disk form, through which the liquid percolates in passing through the apparatus. The chambers of the three intermediate sections A', A², A³ are open at opposite sides, as shown at $d$, to expose the filtering-partitions to the supply and delivery chambers, and the partitions are of sufficient width to close the open sides of said chambers and the end delivery-chambers $a$ $a^4$. The partitions thus form porous walls, which alternate with the chambers and through which the liquid must percolate in passing from the supply to the delivery chambers. Each of the partitions shown in the drawings consists of a skeleton frame of metal, composed of inner and outer concentric rings $c$ $c'$, rigidly connected together by radial bars $c^2$ and blocks or elements $c^3$ of suitable filtering material seated in the sector-shaped openings of the partition, as shown in Fig. 3, 4, and 6. The partitions are preferably tied together in pairs by U-shaped lugs $e$, formed on or secured to the interior of their inner rings $c'$, and bolts $e'$, passing through the contiguous bars of the lugs, as best shown in Fig. 5. The several partitions are free to turn relatively to the adjoining chambered sections of the filter to cause different portions of the filtering-surfaces of the partitions to pass successively through or between the corresponding supply and delivery chambers, about one-third of such surface being always within said chambers and the other two-thirds outside thereof.

Any suitable means may be employed for slowly and continuously rotating the filtering-partitions. In the preferred construction shown in the drawings this is accomplished by flanged friction-wheels $f$, mounted on horizontal shafts F F′ and engaging with annular grooves $f'$, formed in the periphery of the partitions. These shafts are supported in bearings on the standards $A^5$ and caused to turn in unison by a sprocket-chain G, running around sprocket-wheels $g$ $g'$, secured to the shafts. A slow rotary motion is transmitted from the driving-shaft H to one of the shafts F F′ by intermediate worm-gearing H′ $H^2$ or other suitable means.

In order to maintain liquid-tight joints between the sides of the partitions and the contiguous edges or faces of the chambered sections $A$–$A^4$, each partition is provided on the outer sides of its inner and outer rings $c$ $c'$ with annular packing strips or tongues $i$ $i'$, which may be of any suitable construction, but which are preferably constructed of elastic metal and adapted to be forced outward against the opposing flat faces of the filter-sections by the liquid-pressure. For this purpose the annular packing-strips are rigidly secured to the partition at or near their rear edges by screws $j$ or other fastenings, and their front portions, which face the filtering blocks or elements, are detached and recessed on their inner sides, so as to form annular liquid spaces or channels $j'$ between the strips and the opposing sides of the partition-rings. The liquid under pressure enters these channels and forces the free elastic portions of the packing-strips outward against the edges of the chambers on opposite sides of the partitions, thus insuring tight joints at these points. As shown in Fig. 4, sufficient clearance is left between the front edges of the annular packing-strips and the edges of the filtering-blocks to permit the liquid to enter behind the strips. The radial bars $c^2$ of the partitions are provided on opposite faces with similar straight packing strips or tongues $k$. These strips are secured centrally to the bars $c^2$ by screws $k'$ or other fastenings, and their lateral or edge portions are detached and recessed on their inner edges to form longitudinal liquid-channels $k^2$, similar to the channels $j'$. In order to increase the elasticity of the detached portions of the packing-strips, they are provided at the junction of their recessed and unrecessed portions with grooves or depressions $l$.

Opposite the liquid supply and delivery chambers $a$–$a^4$ the end and middle sections A $A^2$ $A^4$ of the filter are preferably provided with segmental aerating, ozonizing, or sterilizing chambers M M′ $M^2$, to the action of which the filtering-partitions C–$C^3$ are subjected while outside of the supply and delivery chambers. These sterilizing-chambers are similar in form to the opposing delivery-chambers A $A^2$ $A^4$ and extend from about the top to the bottom of the sections, as shown in Figs. 1, 2, and 8. The end chambers M $M^2$ are closed on their outer sides and open on their inner sides, so that the backs of the opposing filtering-partitions form the inner walls thereof, while the central chamber M′ is open at both sides, so that the backs of the central filtering-partitions are exposed to the interior of the chamber. Each of these sterilizing-chambers is provided with an inlet branch $m$ for supplying ozone, steam, or any other suitable gaseous sterilizing or purifying agent under pressure to the chambers. This sterilizing agent is forced into and through the filtering-partitions, displacing the liquid contained in the pores of the latter, and when the traveling partitions so charged with the gaseous agent enter between the supply and delivery chambers the liquid from the supply-chambers in permeating the filtering-partitions forces the ozone or other gas ahead of it in the form of minute bubbles into the delivery-chambers, thereby ozonizing or sterilizing the filtered liquid. The inlet branches of the ozonizing-chambers are provided with transverse nipples $m'$, which alternate with similar nipples $m^2$ so as to form a continuous supply-main similar to the supply and delivery mains of the filtering-chambers.

The spaces between the portions of the filtering-partitions outside the supply and delivery chambers are open to the atmosphere, as shown in Fig. 5. In these spaces are arranged brushes N or other cleaning devices, which act upon the opposing faces of the filtering-partitions, so as to remove any impurities adhering thereto. These brushes are preferably located in the lower portions of the spaces between the filtering-partitions and may be rigidly or yieldingly secured to the adjacent sections of the filter, the rotary partitions cleansing themselves by contact with the brushes. The partitions may be further cleansed or rinsed by streams of liquid issuing from spray-pipes $o$, arranged adjacent to the brushes, as shown in Fig. 8. These pipes are preferably connected with the supply-chambers $A'$ $A^3$, as shown.

The filtering medium may consist of any suitable material and be constructed in any ordinary manner, but each block or element preferably consists of a ridged or corrugated surface layer $c^4$, which is comparatively thin and composed of fine-grained filtering material, and a relatively coarse-grained body or mass $c^5$, which supports the thin surface layer, this coarse mass possessing sufficient strength to withstand the liquid-pressure.

As shown in Fig. 3, the corrugated sides of the filtering-blocks face the supply-chambers $a'$ $a^3$.

It will now be understood that when the parts of the apparatus are properly assembled about one-third of the surface of each filtering-partition is always interposed between the corresponding supply and delivery chambers and about one-half of each partition is outside of said chamber and opposite the corresponding sterilizing-chamber and the cleaning appliances.

The operation of the apparatus is as follows: When liquid is forced into the supply-main $b$ $b'$, it enters the supply-chambers $a'$ $a^3$ and passes through the portions of the filtering-partitions $C$–$C^3$, located between said chambers and the delivery-chambers $a$ $a^2$ $a^4$, into the latter chambers, and thence into the delivery-main $b^3$ $b^4$. As soon as pressure is produced in said supply and delivery chambers the annular and radial packing-strips $i$ $i'$ $k'$ are forced against the opposing edges of the chambers, forming tight joints between the members and preventing leakage. The filtering-partitions are constantly and slowly rotated—say at the rate of about four revolutions per hour—in such a direction that they enter between the chambers at the top and leave the same at the bottom. As the partitions rotate the brushes N remove any sediment accumulated on their surfaces and the jets of liquid from the pipes $o$ rinse the same. As the filtering-surfaces arrive opposite the aerating or sterilizing chambers M M' M² the air, steam, or ozone under pressure therein expels the liquid from their pores and by virtue of the property of the carbon in the filtering-blocks condenses many times their volume of the air in the pores, and when those gas or air charged portions of the partitions again come between the liquid-chambers the condensed air or gases contained in the pores are pushed before the entering raw liquid and delivered into the filtered liquid in the delivery-chambers, as hereinbefore described. In this manner the filtering and aerating or sterilizing of the liquid and the cleaning of the filter are carried on continuously and automatically.

The flat sector-shaped surfaces $p$ of the filter-sections located between the opposing ends of the supply and delivery chambers and the sterilizing-chambers form packing-cheeks against which the radial packing-strips $k$ slide as the partitions rotate. These packing-cheeks are of about the same size as the sector-shaped blocks or divisions of the partitions, so that some of such radial strips on each partition will always be in contact with the cheeks and prevent leakage from the supply and delivery chambers.

An important feature of my invention is the construction of the traveling partitions in the form of filtering cells or panels separated or bounded by walls or strips of metal or other suitable material impervious to liquids. The cheeks $p$ are likewise impervious, and the division or bounding members on arriving opposite the same form tight joints therewith, thus acting practically as cut-offs, which prevent the escape of the liquid from the supply and delivery chambers, which would occur if the filtering medium were continuous instead of paneled or cellular, as shown.

By tying adjacent filtering-partitions together by means of the lugs $e$ and bolts $e'$ or other means they are enabled to effectually resist the thrust exerted against their opposing faces by the liquid-pressure.

The apparatus shown in the drawings has four filtering elements or partitions; but a greater or less number may obviously be employed, according to the capacity desired.

An important feature of my improved apparatus is that no sediment or impurities of any kind are allowed to accumulate in the liquid-chambers, the cleansing of the filtering elements being effected wholly outside of the raw and filtered liquid chambers.

The compactness of the apparatus, combined with its large filtering capacity, renders it especially advantageous for municipalities or other localities where real estate or building-space is expensive.

While the filter-sections are preferably circular and semicircular, as shown, they may be rectangular or of other suitable form, if desired. The filtering-partitions are not necessarily rotated continuously, but may in some cases be moved intermittently for bringing some portions of their surfaces outside of the filtering-chambers for cleaning or aerating the same or for other purposes while other portions are in coöperation with the filtering-chambers.

Figure 9:
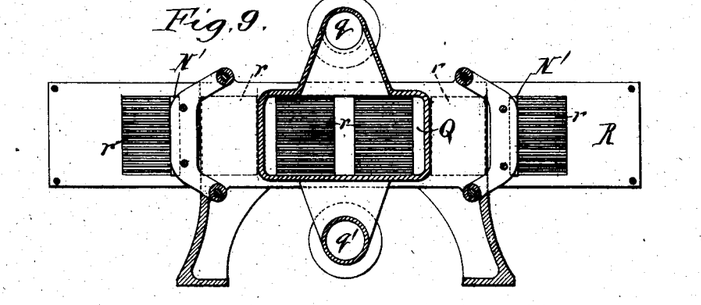
Fig. 9 is a sectional elevation of a modified construction of the apparatus.
Figure 10:
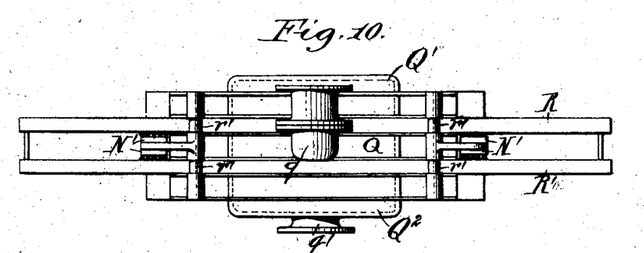
Fig. 10 is a top plan view thereof.

My invention is also not confined to the use of rotary partitions, as the same effect may be produced by imparting other motions to the same—for instance, a reciprocating movement. A modified construction embodying such reciprocating partitions is illustrated in Figs. 9 and 10. In these figures, Q indicates a supply-chamber, having an inlet branch $q$, and $Q'$ $Q^2$ are two delivery or filtered-liquid chambers having a common discharge branch or main $q'$. These chambers are arranged in the same relation as the corresponding chambers of the first-described apparatus, but are rectangular instead of circular and semicircular.

R R' are two oblong filtering-partitions interposed between the opposing open sides of the supply and delivery chambers and having a longitudinal series of filtering-blocks $r$. The partitions are considerably longer than the supply and delivery chambers, so that more or less of their area is at all times outside of the chambers. In the construction illustrated in the drawings each partition has six filtering-blocks and the supply and delivery chambers are of sufficient length to accommodate two adjacent blocks of the partitions at a time, as seen in Fig. 9. The partitions may be guided between antifriction-rollers $r'$ and slowly shifted endwise, first in one direction and then in the other, by any suitable actuating mechanism for presenting different blocks successively to the chambers. In the use of this modified apparatus two of the filtering-blocks are always in service, while the remaining ones are exposed outside of the supply and delivery chambers and subjected to the cleaning action of the brushes $N'$ in the manner described in connection with the first-mentioned apparatus.

I claim as my invention—

1. A pressure-filter, comprising supply and delivery chambers open at their opposing sides and closed on all other sides, and a movable filtering-partition interposed between the opposing open sides of said chambers and arranged partly inside and partly outside thereof, substantially as set forth.

2. A pressure-filter comprising supply and delivery chambers open at their opposing sides and closed on all other sides, a movable filtering-partition interposed between the opposing open sides of said chambers and arranged partly inside and partly outside thereof, and cleaning means for the partition arranged outside of said chambers, substantially as set forth.

3. A filter, comprising a supply-chamber, a delivery-chamber, an interposed filtering-partition exposed to both of said chambers and arranged partly inside and partly outside thereof, the partition being movable past the chambers for successively bringing different portions thereof opposite the same, and means external to said chambers for treating the partition with an aerating or sterilizing agent, substantially as set forth.

4. A filter, comprising liquid supply and delivery chambers open at their opposing sides, an interposed filtering-partition arranged partly inside and partly outside of said chambers, the partition being movable past the chambers for successively bringing different portions thereof between the same, and a supply-chamber for a sterilizing agent arranged adjacent to the exterior portion of said partition, substantially as set forth.

5. A filter, comprising a liquid-supply chamber, a liquid-delivery chamber, an interposed filtering-partition arranged partly inside and partly outside of said chambers, the partitions being movable past the chambers for successively bringing different portions thereof opposite the chambers, means arranged on one side of the partition for treating the exterior portion thereof with a gaseous agent, and means arranged on the opposite side of the partition for cleaning said exterior portion, substantially as set forth.

6. A pressure-filter, comprising supply and delivery chambers open at their opposing sides and closed on all other sides, and a rotary filtering-disk interposed between said chambers and bearing with its flat sides against the opposing faces of the chambers, the disk being arranged partly inside and partly outside of said chambers, substantially as set forth.

7. A filter, comprising a supply-main, a delivery-main, alternating supply and delivery chambers connected with said supply and delivery mains, respectively, and movable filtering-partitions arranged between said opposing supply and delivery chambers and extending outside thereof, substantially as set forth.

8. A filter, comprising alternating supply and delivery chambers open at their opposing sides, the supply chambers being provided with alining supply nipples or branches located at one side of the apparatus, and delivery-chambers having similar alining discharge-nipples located at another side of the apparatus, each of said sets of chambers also having nipples which alternate with and form continuations of the nipples of the other set of chambers, and a movable filtering-partition arranged between each pair of supply and delivery chambers and extending outside thereof, substantially as set forth.

9. A filter comprising segmental supply and delivery chambers arranged side by side, a rotary filtering-partition arranged between said chambers and extending outside thereof, and a segmental sterilizing-chamber arranged adjacent to the portion of said partition located outside of said supply and delivery chambers, substantially as set forth.

10. A filter comprising segmental supply and delivery chambers arranged side by side, a rotary filtering-partition arranged between said chambers and extending outside thereof, a segmental sterilizing-chamber arranged adjacent to one side of the exterior portion of said partition, and cleaning means arranged to act upon the opposite side of said exterior portion, substantially as set forth.

11. A filter comprising alternating circular and semicircular sections arranged side by side and containing alternating supply and delivery chambers of segmental form, the end sections and the central section of the series containing delivery-chambers and the sections intermediate of the end and central sections containing supply-chambers, rotary filtering-partitions interposed between opposing supply and delivery chambers and arranged partly inside and partly outside thereof, and means for rotating said partitions, substantially as set forth.

12. A filter comprising a series of sections arranged side by side and containing alternating supply and delivery chambers which are open at their opposing sides, and movable filtering-partitions interposed between the open sides of said supply and delivery chambers and arranged partly inside and partly outside thereof, said sections being provided adjacent to the exterior portions of said partitions with sterilizing-chambers which are open on the sides facing the partitions, substantially as set forth.

13. A filter, comprising a series of sections arranged side by side and containing alternating supply and delivery chambers which are open at their opposing sides, movable filtering-partitions interposed between the open sides of said supply and delivery chambers and arranged partly inside and partly outside thereof, said sections being provided adjacent to the exterior portions of said partitions with sterilizing-chambers which are open on the sides facing the partitions, and cleaning-brushes acting on the exterior portions of the partitions, substantially as set forth.

14. In a filter, the combination with a supply-chamber and a delivery-chamber, said chambers being open at their opposing sides, of a rotary filtering-partition interposed between said chambers and arranged partly inside and partly outside thereof, and a driving-shaft arranged crosswise of the partition and having an actuating-wheel which engages with the edge of the partition, substantially as set forth.

15. In a filter, the combination with a supply-chamber and a delivery-chamber, said chambers being open at their opposing sides, of a rotary filtering-partition interposed between said chambers and having circumferential grooves, the partition being arranged partly inside and partly outside of said chambers, and a driving-shaft having flanged wheels engaging with the grooved edge of the partition, substantially as set forth.

16. In a filter, the combination of a liquid-chamber having an open side, and a filtering element applied to said open side and provided with a yielding packing strip or tongue bearing against the opposing edge of the chamber and having its rear side exposed to the fluid-pressure in the chamber, whereby the strip is forced against the chamber by said pressure, substantially as set forth.

17. A filter, comprising a supply-chamber and a delivery-chamber, said chambers being open at their opposing sides, and a filtering-partition interposed between said chambers and provided on opposite sides with yielding packing strips or tongues bearing against the opposing faces of the chambers and having their rear sides exposed to the fluid-pressure in the chambers, substantially as set forth.

18. A filter, comprising a supply-chamber and a delivery-chamber, said chambers being open at their opposing sides, and a filtering-partition interposed between said chambers and provided with yielding packing strips or tongues bearing against the opposing faces of the chambers and having portions thereof separated from the partition by intervening liquid-channels which communicate with said chambers, substantially as set forth.

19. A filter, comprising a supply-chamber and a delivery-chamber, said chambers being open at their opposing sides, and a filtering-partition interposed between said chambers and provided with yielding packing strips or tongues bearing against the opposing faces of the chambers, said strips being secured at one edge to the partition and recessed at their rear sides to form liquid-channels, substantially as set forth.

20. A filter, comprising a supply-chamber and a delivery-chamber, said chambers being open at their opposing sides, and a filtering-partition interposed between said chambers and provided with yielding packing strips or tongues bearing against the opposing faces of the chambers, said strips being secured at one edge to the partition and recessed on their rear sides to form liquid-channels and provided with longitudinal grooves for increasing their elasticity, substantially as set forth.

21. A filter, comprising a segmental supply-chamber and a segmental delivery-chamber, said chambers being open at their opposing sides and closed on all other sides, and a rotary filtering-partition arranged between said chambers and provided at its sides with yielding annular packing strips or tongues, substantially as set forth.

22. A pressure-filter comprising supply and delivery chambers open at their opposing sides, and a movable filtering-partition interposed between the open sides of said chambers and having a series of filtering cells or panels separated by impervious members, said partition being arranged partly inside and partly outside of said chambers, substantially as set forth.

23. A filter comprising a supply-chamber, a delivery-chamber, and an interposed movable partition arranged partly inside and partly outside of said chambers and having cells or panels of filtering material and impervious cut-off members separating the panels and coöperating with the opposing faces of said chambers, substantially as set forth.

24. A filter comprising a supply-chamber, a delivery-chamber, and an interposed movable partition arranged partly inside and partly outside of said chambers and having cells or panels of filtering material and impervious cut-off members bounding the cells or panels and coöperating with the opposing faces of said chambers, substantially as set forth.

25. A filter comprising sections containing supply and delivery chambers which are open at their opposing sides, a movable partition interposed between said chambers and arranged partly inside and partly outside thereof, said sections being provided at the ends of their chambers with cut-off faces or cheeks and the movable partition having a series of filtering cells or panels and impervious division members separating the panels and arranged to bear against said cheeks, substantially as set forth.

26. A filter, comprising a supply-chamber, delivery-chambers arranged on opposite sides of the supply-chamber, filtering-partitions interposed between opposite sides of the supply-chamber and the delivery-chambers, and means for tying the partitions together, substantially as set forth.

27. A filter, comprising a supply-chamber, delivery-chambers arranged on opposite sides of the supply-chamber, filtering-partitions interposed between opposite sides of the supply-chamber and the delivery-chambers and having laterally-extending lugs, and tie-bolts connecting the lugs of the opposing partitions, substantially as set forth.

28. A filter, comprising a segmental supply-chamber and a segmental delivery-chamber, said chambers being open at their opposing sides, and a rotary partition having sector-shaped filtering blocks or sections and yielding radial packing strips or tongues arranged at the sides thereof between adjacent blocks and bearing against the opposing edges of said chambers, substantially as set forth.

Witness my hand this 2d day of November, 1904.

WILLIAM H. DOPP.

Witnesses:
 THEO. L. POPP,
 E. M. GRAHAM.